US012666475B2

(12) United States Patent
Liu

(10) Patent No.: US 12,666,475 B2
(45) Date of Patent: Jun. 23, 2026

(54) TRANSMISSION METHOD, CONFIGURATION METHOD, AND APPARATUS FOR REMOTE UE, AND ELECTRONIC DEVICE

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 546 days.

(21) Appl. No.: 17/956,568

(22) Filed: Sep. 29, 2022

(65) Prior Publication Data

US 2023/0013067 A1    Jan. 19, 2023

Related U.S. Application Data

(63) Continuation of application No. PCT/CN2021/089116, filed on Apr. 23, 2021.

(30) Foreign Application Priority Data

Apr. 28, 2020    (CN) .......................... 202010350623.7

(51) Int. Cl.
*H04W 76/14*          (2018.01)
(52) U.S. Cl.
CPC .................................. *H04W 76/14* (2018.02)
(58) Field of Classification Search
CPC . H04W 76/14; H04W 28/0268; H04W 88/04; H04W 28/24; H04W 40/22; H04W 24/02; H04W 76/23; H04W 92/18
USPC ....................................................... 370/329
See application file for complete search history.

(56) References Cited

U.S. PATENT DOCUMENTS

| 11,012,194 | B2 * | 5/2021 | Zhang ................... H04L 5/0044 |
| 12,335,923 | B2 * | 6/2025 | Han ...................... H04W 72/02 |
| 2018/0152986 | A1 | 5/2018 | Jung et al. |
| 2018/0176927 | A1 | 6/2018 | Deng et al. |

(Continued)

FOREIGN PATENT DOCUMENTS

| CN | 107535011 A | 1/2018 |
| CN | 108307472 A | 7/2018 |

(Continued)

OTHER PUBLICATIONS

InterDigital Inc. "QoS Management for NR V2X" 3GPP RAN WG2 Meeting #107, Prague, Czech Republic, Aug. 2019, R2-1909593, 4 Pages. Office Action recites portions of the text from pp. 1 and 4 Fourth entry in the non-patent literature references of the IDS filed on Dec. 12, 2023 (Year: 2019).*

(Continued)

*Primary Examiner* — Faisal Choudhury
(74) *Attorney, Agent, or Firm* — BROOKS KUSHMAN P.C.

(57) ABSTRACT

A transmission method, a configuration method, and an apparatus for remote UE, and an electronic device, and pertains to the field of communications technologies. The transmission method for the remote terminal UE includes: obtaining configuration parameters for a PC5 interface for transmission of relay service from a network-side device or relay UE; and establishing, based on the obtained configuration parameters, a sidelink radio bearer SLRB and performing data transmission.

11 Claims, 6 Drawing Sheets

Uu interface

Relay UE

Sidelink interface

Remote UE

(56) References Cited

U.S. PATENT DOCUMENTS

| | | | | |
|---|---|---|---|---|
| 2020/0037190 A1 * | 1/2020 | Wu | .................. | H04W 28/0278 |
| 2021/0105066 A1 | 4/2021 | Uchiyama et al. | | |
| 2021/0136628 A1 | 5/2021 | Uchiyama | | |
| 2022/0007447 A1 * | 1/2022 | Hong | .................. | H04W 76/18 |
| 2022/0338092 A1 * | 10/2022 | Wang | .................. | H04W 76/14 |
| 2023/0023571 A1 * | 1/2023 | Xing | .................. | H04M 15/93 |

FOREIGN PATENT DOCUMENTS

| | | | | | |
|---|---|---|---|---|---|
| CN | 108307489 A | 7/2018 | | | |
| CN | 108391285 A | 8/2018 | | | |
| EP | 3413626 A1 | 12/2018 | | | |
| EP | 3579642 A1 * | 12/2019 | ........ | H04W 52/0212 |
| JP | 2018125786 A | 8/2018 | | | |
| JP | 2018191130 A | 11/2018 | | | |
| WO | 2018028694 A1 | 2/2018 | | | |
| WO | WO-2021200510 A1 * | 10/2021 | ............ | H04W 92/18 |

OTHER PUBLICATIONS

International Search Report and Written Opinion for Application No. PCT/CN2021/089116, dated Jun. 29, 2021, 9 Pages.

Vivo. "Protocol Stack and Service Continuity for L2 and L3 Relay" 3GPP R2-2007041, Aug. 7, 2020, 7 pages.

First Office Action for Chinese Application No. 202010350623.7, dated Jun. 29, 2023, 9 Pages.

First Office Action for Japanese Application No. 2022-564651, dated Jul. 25, 2023, 8 Pages.

Extended European Search Report for Application No. 21796034.3, dated Sep. 22, 2023, 12 Pages.

ZTE "Discussion on connection establishment and bearer setup" 3GPP TSG-RAN WG2 Meeting #96, Reno, USA, Nov. 2016, R2-168149, 4 Pages.

InterDigital Inc. "QoS Management for NR V2X" 3GPP RAN WG2 Meeting #106, Reno, USA, May 2019, R2-1906386, 4 Pages.

InterDigital Inc. "QoS Management for NR V2X" 3GPP RAN WG2 Meeting #107, Prague, Czech Republic, Aug. 2019, R2-1909593, 4 Pages.

* cited by examiner

Uu interface

Relay UE

Sidelink interface

Remote UE

Obtain configuration parameters for a PC5 interface for transmission of relay service from a network-side device or relay UE    101

Establish, based on the obtained configuration parameters, a sidelink radio bearer SLRB and perform data transmission    102

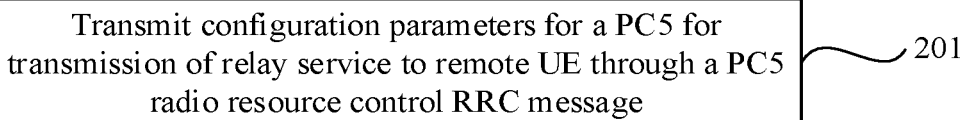

Transmit configuration parameters for a PC5 for
transmission of relay service to remote UE through a PC5
radio resource control RRC message                    201

FIG. 4

Transmit configuration parameters for a PC5 interface for transmission of
relay service to remote UE through any one of the following manners:
transmitting the configuration parameters for the PC5 interface for
transmission of relay service to the remote UE through a system
information block SIB of a network-side device;
transmitting the configuration parameters for the PC5 interface for
transmission of relay service to the remote UE through a pre-configured
message;
transmitting the configuration parameters for the PC5 interface for
transmission of relay service to the remote UE through a Uu radio resource
control RRC message; and
forwarding the configuration parameters for the PC5 interface for relay
service transmission to the remote UE through relay UE          301

FIG. 5

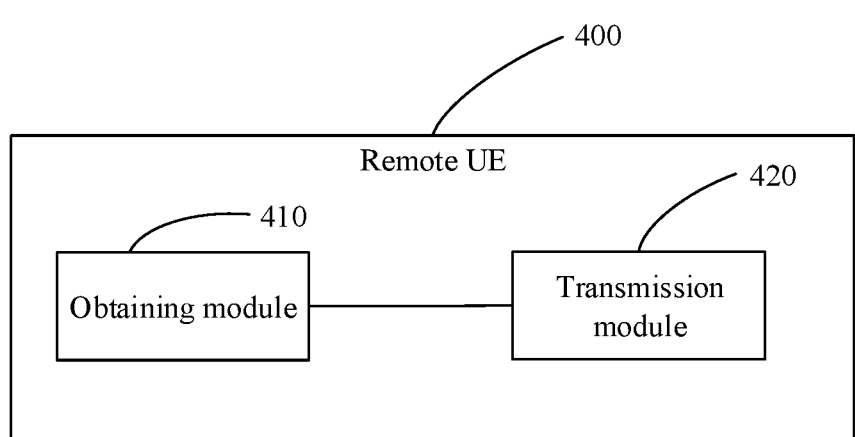

400

Remote UE

420

410

Obtaining module | Transmission module

FIG. 6

TRANSMISSION METHOD, CONFIGURATION METHOD, AND APPARATUS FOR REMOTE UE, AND ELECTRONIC DEVICE

CROSS-REFERENCE TO RELATED APPLICATIONS

This application is a continuation of PCT International Application No. PCT/CN2021/089116 filed on Apr. 23, 2021, which claims priority to Chinese Patent Application No. 202010350623.7, filed on Apr. 28, 2020, which are incorporated herein by reference in their entireties.

TECHNICAL FIELD

The present invention relates to the field of communications technologies, and in particular, to a transmission method, a configuration method, and an apparatus for remote UE, and an electronic device.

BACKGROUND

In current systems, a sidelink (SL) transmit-end UE in idle or inactive state obtains a transmission configuration related to a PC5 interface through a system information block (SIB). The transmit-end UE in connected state reports QoS (QoS) profile information through a Uu radio resource control (RRC) message and then obtains transmission configuration information related to the PC5 interface sent in the RRC message. The transmit-end UE in offline state obtains transmission configuration information related to the PC5 interface through a pre-configured message.

In a sidelink relay architecture, configuration information for a PC5 interface of remote UE cannot be directly determined by using the QoS profile of a service, so that end-to-end QoS requirements for the service of the remote UE cannot be guaranteed.

SUMMARY

Embodiments of this application provide a transmission method, a configuration method, and an apparatus for remote UE, and an electronic device, to resolve a problem of configuring parameters for a PC5 interface of remote UE in a sidelink relay architecture, meeting end-to-end QoS requirements for a service of the remote UE.

According to a first aspect, an embodiment of this application provides a transmission method for remote UE, including:

obtaining configuration parameters for a PC5 interface for transmission of relay service from a network-side device or relay UE; and establishing, based on the obtained configuration parameters, a sidelink radio bearer SLRB and performing data transmission.

According to a second aspect, an embodiment of this application provides a configuration method for remote UE, including:

transmitting configuration parameters for a PC5 interface for transmission of relay service to the remote UE through a PC5 radio resource control RRC message.

According to a third aspect, an embodiment of this application provides a configuration method for remote UE, including:

transmitting configuration parameters for a PC5 interface for transmission of relay service to the remote UE through any one of the following manners:

transmitting the configuration parameters for the PC5 interface for transmission of relay service to the remote UE through a system information block SIB of a network-side device;

transmitting the configuration parameters for the PC5 interface for transmission of relay service to the remote UE through a pre-configured message;

transmitting the configuration parameters for the PC5 interface for transmission of relay service to the remote UE through a Uu radio resource control RRC message; and forwarding the configuration parameters for the PC5 interface for transmission of relay service to the remote UE through relay UE.

According to a fourth aspect, an embodiment of this application further provides a transmission apparatus of remote UE, including:

an obtaining module, configured to obtain configuration parameters for a PC5 interface for transmission of relay service from a network-side device or relay UE; and a transmission module, configured to establish, based on the obtained configuration parameters, a sidelink radio bearer SLRB and perform data transmission.

According to a fifth aspect, an embodiment of this application provides a configuration apparatus for remote UE, including:

a first sending module, configured to transmit configuration parameters for a PC5 interface for transmission of relay service to the remote UE through a PC5 radio resource control RRC message.

According to a sixth aspect, an embodiment of this application provides a configuration apparatus for remote UE, including:

a second sending module, configured to transmit configuration parameters for a PC5 interface for transmission of relay service to the remote UE through any one of the following manners:

transmitting the configuration parameters for the PC5 interface for transmission of relay service to the remote UE through a system information block SIB of a network-side device;

transmitting the configuration parameters for the PC5 interface for transmission of relay service to the remote UE through a pre-configured message;

transmitting the configuration parameters for the PC5 interface for transmission of relay service to the remote UE through a Uu radio resource control RRC message; and forwarding the configuration parameters for the PC5 interface for transmission of relay service to the remote UE through relay UE.

According to a seventh aspect, an embodiment of this application further provides an electronic device, including a processor, a memory, and a program or instruction stored in the memory and capable of running on the processor, where when the program or instruction is executed by the processor, the steps of the foregoing method are implemented.

According to an eighth aspect, an embodiment of this application further provides a readable storage medium, where the readable storage medium stores a program or instruction, and when the program or instruction is executed by a processor, the steps of the foregoing method are implemented.

According to a ninth aspect, an embodiment of this application provides a chip, where the chip includes a processor and a communications interface, the communications interface is coupled to the processor, and the processor is configured to run a program or instruction to implement the methods according to the first aspect, the second aspect, and the third aspect.

According to a tenth aspect, an embodiment of this application provides a computer program product, stored in a readable storage medium, where the computer program product is executed by at least one processor to implement the methods according to the first aspect, the second aspect, and the third aspect.

According to an eleventh aspect, an embodiment of this application provides a terminal, where the terminal is configured to perform the methods according to the first aspect, the second aspect, and the third aspect.

In the embodiments of this application, the remote UE can obtain configuration parameters for the PC5 interface for transmission of relay service from the network-side device or relay UE, which facilitates unified parameter control by the network-side device to ensure end-to-end transmission performance of the service of the remote UE and improve system performance and user experiences.

BRIEF DESCRIPTION OF THE DRAWINGS

To describe the technical solutions in the embodiments of this application more clearly, the following briefly describes the accompanying drawings required for describing the embodiments of this application. Apparently, the accompanying drawings in the following description show merely some embodiments of the present invention, and a person of ordinary skill in the art may derive other drawings from these accompanying drawings without creative efforts.

FIG. 4 is a schematic flowchart of a configuration method for remote UE of a relay terminal according to an embodiment of this application;

FIG. 5 is a schematic flowchart of a configuration method for remote UE of a network-side device according to an embodiment of this application;

FIG. 6 is a schematic modular structure diagram of remote UE according to an embodiment of this application;

DETAILED DESCRIPTION

Figure 1:
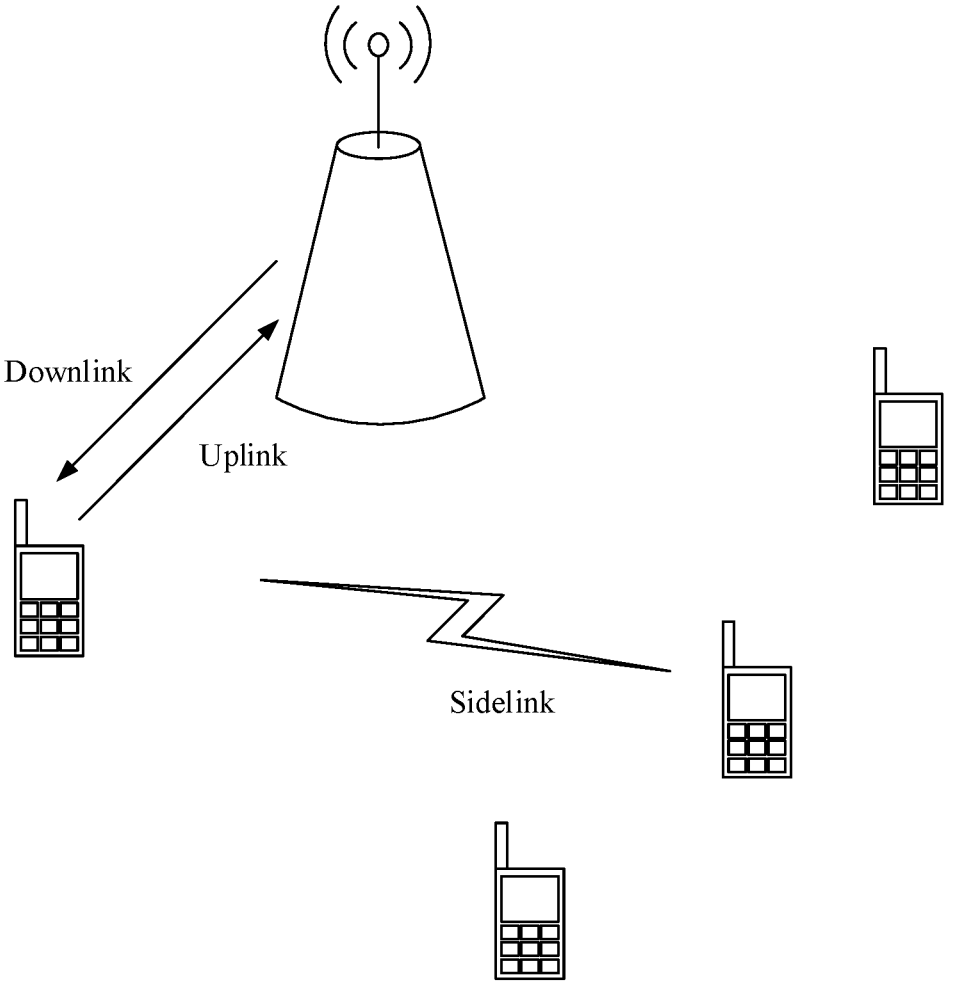
FIG. 1 is a schematic diagram of a sidelink communication in a wireless communications system.

The following clearly and completely describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances so that the embodiments of this application can be implemented in other orders than the order illustrated or described herein. In addition, "and/or" in the specification and claims represents at least one of connected objects, and the character "/" generally indicates an "or" relationship between the associated objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. A CDMA system can implement radio technologies such as CDMA2000, and universal terrestrial radio access (UTRA). UTRA includes wideband CDMA (WCDMA) and other CDMA variants. A TDMA system can implement radio technologies such as global system for mobile communications (GSM). An OFDMA system may implement radio technologies such as ultramobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (for example, LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technology described herein may be used in the above-mentioned systems and radio technologies as well as other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Referring to FIG. 1, FIG. 1 is a block diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal side device such as a mobile phone, a tablet computer (Tablet Personal Computer), a laptop computer, a personal digital assistant (PDA), a mobile internet device (MID), a wearable device, or an in-vehicle device. It should be noted that the terminal 11 is not limited to any specific type in the embodiments of this application. The network-side device 12 may be a base station or a core network, where the base station may be a base station of 5G or a later version (for example, gNB or 5G NR NB), or a base station in other communications systems (for example, an eNB, a WLAN access point, or another access point), or a location server (for example, an E-SMLC or LMF (Location manager function)). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate terms in the art. As long as the same technical effects are achieved, the base station is not limited to a specific technical term. It should be noted that the base station in the NR system is taken only as an example in the embodiments of this application, but a specific type of the base station is not limited.

The base station may communicate with the terminal 11 under the control of a base station controller. In various examples, the base station controller may be a part of the core network or some base stations. Some base stations may exchange control information or user data with the core network by using backhauls. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may communicate wirelessly with the terminal 11 through one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, and a picocell base station). The base stations may also use different radio technologies, such as cellular and WLAN radio access technologies. The base stations may be associated with a same access network or operator deployment or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL) transmission (for example, from the terminal 11 to the network-side device 12), a downlink for carrying a downlink (DL) transmission (for example, from the network-side device 12 to the terminal 11), or a sidelink (SL) for carrying transmission between the terminal 11 and another terminal

11. The UL transmission may also be referred to as reverse link transmission, while the DL transmission may also be referred to as forward link transmission. A licensed band, an unlicensed band, or both may be used for downlink transmission. Similarly, a licensed band, an unlicensed band, or both may be used for uplink transmission.

A long term evolution (LTE) system supports a SL for direct data transmission between user equipments (UE) without using a network device.

LTE sidelink is designed to be applicable to specific public safety affairs (for example, emergency communication on a fire site or a disaster site such as an earthquake), vehicle to everything (V2X) communication, or the like. Vehicle to everything communication includes various services, for example, basic security communication, advanced driving (self-driving), platooning, and sensor extension. LTE sidelink supports only broadcast communication, and therefore is mainly used for basic security communication. Other advanced V2X services with strict quality of service (QoS) requirements in terms of delay and reliability need to be supported by new radio (NR) sidelink.

A 5G NR system may be used in a working frequency band above 6 GHz that is not supported by LTE, and supports a larger working bandwidth, but a current NR system only supports an interface between a base station and a terminal, and does not support a sidelink interface for direct communication between terminals.

The sidelink interface may be alternatively referred to as a PC5 interface. Current sidelink transmission mainly includes the following transmission forms: broadcast, groupcast, and unicast. Unicast, as its name implies, is a one-to-one (one to one) transmission, groupcast is a one-to-many (one to many) transmission, and broadcast is also a one to many transmission, but for broadcast, there is no concept that UEs belong to a same group. Currently, sidelink unicast communication and sidelink groupcast communication support a physical layer hybrid automatic repeat request (HARD) feedback mechanism.

There are a total of two resource allocation modes for sidelink UE:

(1) Base station scheduling mode (Mode 1): BS schedules SL resource(s) to be used by UE for SL transmission(s), that is, a network-side device (base station) controls and allocates resource(s) for each UE; and (2) UE autonomous mode (Mode 2): UE determines, that is, BS does not schedule, SL transmission resource(s) within SL resources configured by BS/network or pre-configured SL resources, that is, each UE autonomously selects resource(s).

Figure 2:
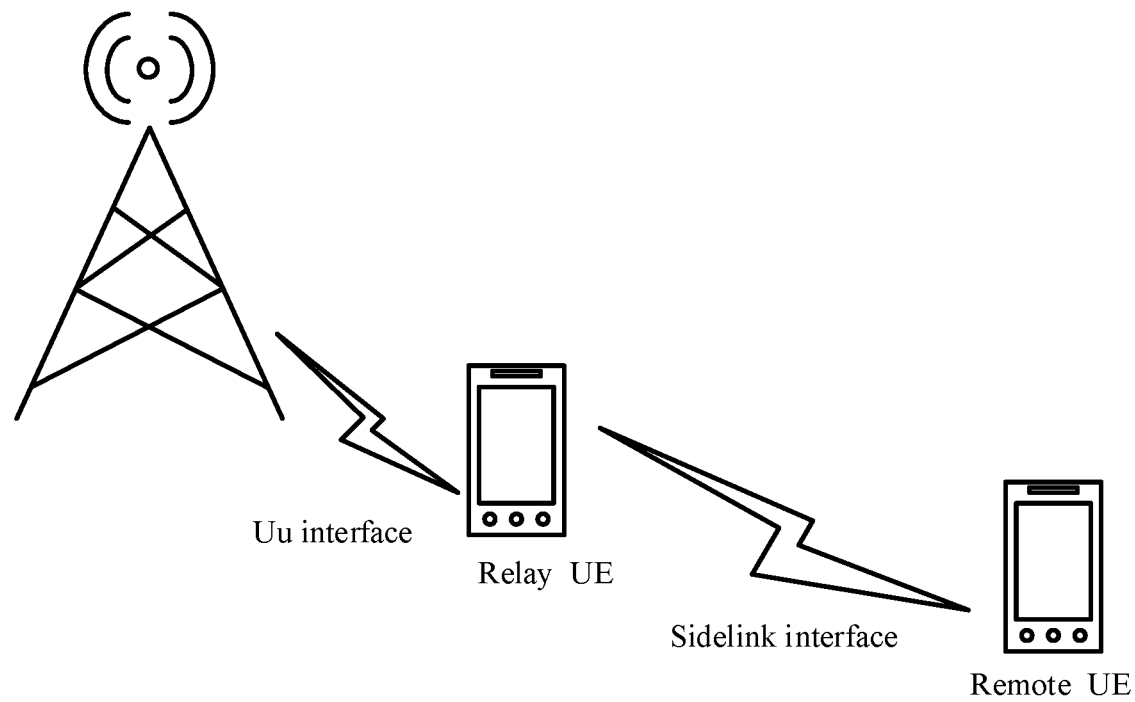
FIG. 2 is a schematic diagram of a relay scenario in a wireless communications system.

In a typical sidelink relay scenario as shown in FIG. 2, data of a remote UE is forwarded by relay UE to a base station through a sidelink between the remote UE and the relay UE. In this scenario, data transmission is performed between the remote UE and the base station, and the relay UE plays a role of data forwarding.

In current systems, a V2X transmit-end UE in idle or inactive state obtains a transmission configuration related to a PC5 interface through a system information block (SIB). The transmit-end UE in connected state reports QoS profile information through a Uu radio resource control (RRC) message and then obtains transmission configuration information related to the PC5 interface sent in the RRC message. The transmit-end UE in offline state obtains transmission configuration information related to the PC5 interface through a pre-configured message. In existing procedures for obtaining configuration information, the transmission configuration is basically determined based on the QoS profile of the to-be-initiated service of the transmit UE, mainly including sidelink radio bearer (SLRB), packet data convergence protocol (PDCP)/radio link control protocol (RLC)/media access control (MAC)/port physical layer (PHY), and configuration information of each layer.

While in a sidelink relay architecture, the configuration information for the PC5 interface cannot be determined directly by using the QoS profile of the service. The QoS profile in this case is end-to-end QoS requirements for the service, which means that QoS parameter allocation needs to be performed for the service on two links between the remote UE and the relay UE and between the relay UE and the base station, to meet final end-to-end QoS requirements. For example, if an end-to-end delay requirement (PDB) for a service is 100 ms, when the service is transmitted from a transmit-end UE to a receive-end UE through a PC5 link only over one hop, a maximum delay of this hop is set to 100 ms. For example, a PDCP service data unit (SDU) discard timer is set to 100 ms, and data that has not been transmitted beyond 100 ms can be directly deleted. When the service is transmitted through the relay architecture, a maximum delay from the transmit-end remote UE to the base station can be 100 ms. The base station needs to perform a centralized configuration, to make the maximum delay for the PC5 link between the remote UE and the relay UE meet the end-to-end delay requirement.

Embodiments of this application provide a transmission method, a configuration method, and an apparatus for remote UE, and an electronic device, to properly configure parameters for a PC5 interface of remote UE in a sidelink relay architecture, meeting end-to-end QoS requirements for a service of the remote UE.

Figure 3:
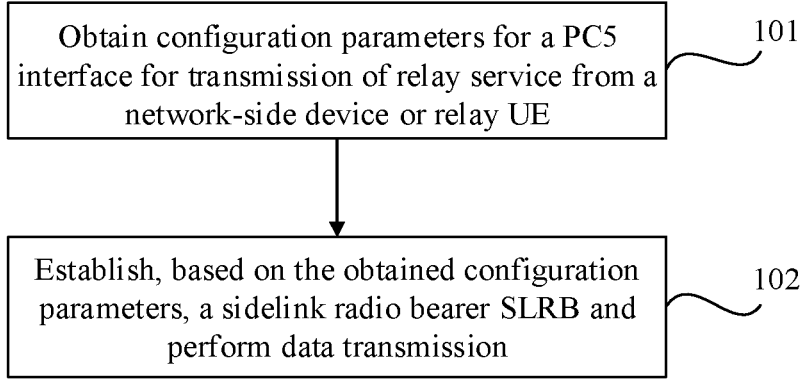
FIG. 3 is a schematic flowchart of a transmission method for remote UE according to an embodiment of this application.

An embodiment of this application provides a configuration method for remote UE, applied to the remote UE. As shown in FIG. 3, the method includes:

Step 101: Obtain configuration parameters for a PC5 interface for transmission of relay service from a network-side device or relay UE; and Step 102: Establish, based on the obtained configuration parameters, a sidelink radio bearer SLRB and perform data transmission.

In this embodiment, the remote UE can obtain configuration parameters for the PC5 interface for transmission of relay service from the network-side device or relay UE, which facilitates unified parameter control by the network-side device to ensure end-to-end transmission performance of the service of the remote UE and improve system performance and user experiences.

In some embodiments, the obtaining configuration parameters for a PC5 interface for transmission of relay service from a network-side device or relay UE includes any one of the following:

obtaining the configuration parameters for the PC5 interface for transmission of relay service through a system information block SIB of the network-side device if the remote UE is in an idle state or inactive state;

obtaining the configuration parameters for the PC5 interface for transmission of relay service through a pre-configured message of the network-side device if the remote UE is in an offline state;

obtaining the configuration parameters for the PC5 interface for transmission of relay service from the network-side device through a Uu radio resource control RRC message if the remote UE is in a connected state; and obtaining the configuration parameters for the PC5 interface for transmission of relay service from the relay UE through a PC5 RRC message if the remote UE is in an idle state, inactive state, offline state, or connected state.

Uu RRC signaling for the remote UE refers to RRC signaling between the remote UE and a serving cell and/or base station, a Uu interface refers to an interface link between the relay UE and the serving cell and/or base station, PC5-RRC signaling for the remote UE refers to RRC signaling for a sidelink interface between the remote UE and the relay UE, and the PC5 interface refers to the sidelink interface link between the remote UE and the relay UE. Taking the Uu RRC signaling for the remote UE as an example, the two ends are the remote UE and the base station, an uplink transmission path is from the remote UE to the relay UE through the PC5 interface first, and then from the Uu interface of the relay UE to the base station, and an downlink transmission path is the opposite to the uplink transmission path, that is to say, the Uu RRC of the remote UE needs to go through air interface transmissions over two links.

In some embodiments, in the SIB and pre-configured message, the configuration parameters for the PC5 interface for transmission of relay service include a sidelink SL radio bearer RB configuration list and an SL radio link layer control protocol RLC bearer configuration list, the SLRB configuration list includes at least one SLRB configuration and an index of the at least one SLRB configuration; and the SL RLC bearer configuration list includes at least one RLC bearer configuration, an index of the at least one RLC bearer configuration, and an index of an SLRB configuration corresponding to the index of the RLC bearer configuration.

When the remote UE obtains the configuration parameters for the PC5 interface for transmission of relay service from the network-side device, the network-side device may transmit the SLRB configuration list and the SL RLC bearer configuration list to the remote UE through a system information block or a pre-configured message, and the remote UE may look up, based on QoS parameters of a to-be-initiated service, a corresponding SLRB configuration and RLC bearer configuration from the SLRB configuration list and the SL RLC bearer configuration list.

In a specific embodiment, the SLRB configuration list includes a first SLRB configuration list for UE-to-UE direct PC5 communication and a second SLRB configuration list for communication between the remote UE and the network-side device through the relay UE.

The SL RLC bearer configuration list includes a first RLC bearer configuration list for UE-to-UE direct PC5 communication and a second RLC bearer configuration list for communication between the remote UE and the network-side device through the relay UE.

To be specific, for the UE-to-UE direct PC5 communication and the communication between the remote UE and the network-side device through the relay UE, the network-side device configures corresponding two lists respectively, so that when communicating with the network-side device through the relay UE, the remote UE may look up, based on the QoS parameters of the to-be-initiated service, a corresponding SLRB configuration and RLC bearer configuration from the dedicated lists. For some configuration parameters, values in the first SLRB configuration list may be the same as values in the second SLRB configuration list. For some configuration parameters, values in the first SLRB configuration list may be different from values in the second SLRB configuration list. For some configuration parameters, values in the first RLC bearer configuration list may be the same as values in the second RLC bearer configuration list.

For some configuration parameters, values in the first RLC bearer configuration list may be different from values in the second RLC bearer configuration list.

In a specific embodiment, the SLRB configuration includes a plurality of SLRB configuration parameters, and at least one of the plurality of SLRB configuration parameters includes a first SLRB configuration value for UE-to-UE direct PC5 communication and a second SLRB configuration value for communication between the remote UE and the network-side device through the relay UE.

The RLC bearer configuration includes a plurality of RLC configuration parameters, and at least one of the plurality of RLC configuration parameters includes a first RLC bearer configuration value for UE-to-UE direct PC5 communication and a second RLC bearer configuration value for communication between the remote UE and the network-side device through the relay UE.

That is, for the UE-to-UE direct PC5 communication and the communication between the remote UE and the network-side device through the relay UE, the network-side device may be configured with different values of the SLRB configuration parameters and RLC bearer configuration parameters. For some configuration parameters, values corresponding to the UE-to-UE direct PC5 communication may be the same as values corresponding to the communication between the remote UE and the network-side device through the relay UE, that is, the two methods use same values. For some configuration parameters, values corresponding to the UE-to-UE direct PC5 communication may be different from values corresponding to the communication between the remote UE and the network-side device through the relay UE, that is, the two methods use different values.

In some embodiments, the SLRB configuration list includes SLRB configurations for UE-to-UE direct PC5 communication, and the establishing, based on the obtained configuration parameters, an SLRB and performing data transmission includes:

updating quality of service QoS parameters of a to-be-initiated service according to a protocol specification or a first updating parameter configured by the network-side device; and looking up an SLRB configuration and an RLC bearer configuration by using the updated QoS parameters, and establishing an SLRB based on parameters in the SLRB configuration and the RLC bearer configuration and performing data transmission.

In this way, the network-side device does not need to configure a dedicated SLRB configuration list and RLC bearer configuration list for communication between the remote UE and the network-side device through the relay UE, but only needs to configure a first updating parameter for the remote UE, which can reduce signaling overhead of the network-side device.

In some embodiments, the SLRB configuration list includes SLRB configurations for UE-to-UE direct PC5 communication, and the establishing, based on the obtained configuration parameters, an SLRB and performing data transmission includes:

looking up, based on QoS parameters of a to-be-initiated service, an SLRB configuration and an RLC bearer configuration that match the QoS parameters;

updating parameters in a found SLRB configuration and a found RLC bearer configuration according to a protocol specification or a second updating parameter configured by the network-side device; and establishing an SLRB based on the updated parameters and performing data transmission.

In this way, the network-side device does not need to configure a dedicated SLRB configuration list and RLC bearer configuration list for communication between the remote UE and the network-side device through the relay UE, but only needs to configure the second updating parameter for the remote UE, which can reduce signaling overhead of the network-side device.

In some embodiments, the looking up, based on QoS parameters, an SLRB configuration and an RLC bearer configuration includes:

looking up, based on the QoS parameters, an SLRB configuration matching the QoS parameters in the SLRB configuration list, looking up, based on an index of the SLRB configuration, an index of a corresponding RLC bearer configuration, looking up, based on the index of the RLC bearer configuration, the corresponding RLC bearer configuration, and establishing, based on the found SLRB configuration and the found RLC bearer configuration, an SLRB and performing data transmission; and using a default SLRB as a configured SLRB to perform data transmission if no SLRB configuration matching the QoS parameters is found in the SLRB configuration list.

In some embodiments, in a case that the remote UE obtains the configuration parameters for the PC5 interface for transmission of relay service from the relay UE through a PC5 RRC message, before obtaining the configuration parameters for the PC5 interface for transmission of relay service through the PC5 RRC message, the method further includes:

transmitting QoS parameters of a to-be-initiated service to the relay UE. In this way, the relay UE may transmit the QoS parameters of the to-be-initiated service of the remote UE to the network-side device, and dedicated configuration parameters for the PC5 interface for transmission of relay service is configured by the network-side device for the remote UE based on the QoS parameters of the to-be-initiated service, so that the PC5 interface can be reasonably configured to ensure end-to-end transmission performance of the service of the remote UE and improve system performance and user experiences.

In some embodiments, in a case that the configuration parameters for the PC5 interface for transmission of relay service are obtained from the network-side device through a Uu radio resource control RRC message, before obtaining the configuration parameters for the PC5 interface for transmission of relay service through the Uu RRC message, the method further includes:

transmitting QoS parameters of a to-be-initiated service and relay indication information to the network-side device. In this way, dedicated configuration parameters for the PC5 interface for transmission of relay service may be configured by the network-side device for the remote UE based on the QoS parameters of the to-be-initiated service.

In the foregoing embodiments, the SLRB configuration includes at least one of the following:

an SL service data adaptation protocol SDAP configuration parameter;

an SL packet data convergence protocol PDCP configuration parameter; and a transmission range configuration parameter.

The RLC bearer configuration includes at least one of the following:

an RLC configuration parameter;

a medium access control MAC configuration parameter; and a physical layer configuration parameter.

An embodiment of this application provides a configuration method for remote UE, applied to relay UE. As shown in FIG. 4, the method includes:

Step 201: Transmit configuration parameters for a PC5 interface for transmission of relay service to the remote UE through a PC5 radio resource control RRC message.

In this embodiment, the remote UE can obtain configuration parameters for the PC5 interface for transmission of relay service from the relay UE, which facilitates unified parameter control by the network-side device to ensure end-to-end transmission performance of the service of the remote UE and improve system performance and user experiences.

In some embodiments, before the transmitting configuration parameters for a PC5 interface for transmission of relay service to the remote UE through a PC5 RRC message, the method further includes:

receiving quality of service QoS parameters of a to-be-initiated service transmitted by the remote UE;

reporting the QoS parameters of the to-be-initiated service of the remote UE to a network-side device;

receiving configuration information transmitted by the network-side device through a Uu interface, where the configuration information includes configuration information for relay UE and/or configuration information for the remote UE; and generating, based on the configuration information transmitted by the network-side device, configuration parameters for the PC5 interface for transmission of relay service.

In this way, the relay UE may transmit the QoS parameters of the to-be-initiated service of the remote UE to the network-side device, and dedicated configuration parameters for the PC5 interface for transmission of relay service is configured by the network-side device for the remote UE based on the QoS parameters of the to-be-initiated service.

In some embodiments, the generating, based on the configuration information transmitted by the network-side device, configuration parameters for the PC5 interface for transmission of relay service includes any one of the following:

generating, based on configuration information of the remote UE, the configuration parameters for the PC5 interface for transmission of relay service if the configuration information transmitted by the network-side device includes the configuration information of the remote UE; and generating, based on configuration information of relay UE, the configuration parameters for the PC5 interface for transmission of relay service if the configuration information transmitted by the network-side device includes the configuration information of the relay UE.

An embodiment of this application provides a configuration method for a remote terminal UE, applied to a network-side device. As shown in FIG. 5, the method includes:

Step 301: Transmit configuration parameters for a PC5 interface for transmission of relay service to the remote UE through any one of the following manners:

transmitting the configuration parameters for the PC5 interface for transmission of relay service to the remote UE through a system information block SIB of a network-side device;

transmitting the configuration parameters for the PC5 interface for transmission of relay service to the remote UE through a pre-configured message;

transmitting the configuration parameters for the PC5 interface for transmission of relay service to the remote UE through a Uu radio resource control RRC message; and forwarding the configuration parameters for the PC5 interface for transmission of relay service to the remote UE through relay UE.

In this embodiment, the remote UE can obtain configuration parameters for the PC5 interface for transmission of relay service from the network-side device, which facilitates unified parameter control by the network-side device to ensure end-to-end transmission performance of the service of the remote UE and improve system performance and user experiences.

In some embodiments, before the transmitting the configuration parameters for the PC5 interface for transmission of relay service to the remote UE through a Uu RRC message, the method further includes:

receiving quality of service QoS parameters of a to-be-initiated service reported by the remote UE; and determining, based on the QoS parameters, configuration parameters for the PC5 interface for transmission of relay service. In this way, dedicated configuration parameters for the PC5 interface for transmission of relay service is configured by the network-side device for the remote UE based on the QoS parameters of the to-be-initiated service, so that the PC5 interface can be reasonably configured to ensure end-to-end transmission performance of the service of the remote UE and improve system performance and user experiences.

In some embodiments, before the forwarding the configuration parameters for the PC5 interface for transmission of relay service to the remote UE through relay UE, the method further includes:

receiving the quality of service QoS parameters of the to-be-initiated service of the remote UE reported by the relay UE; and determining, based on the QoS parameters, configuration parameters for the PC5 interface for transmission of relay service. In this way, dedicated configuration parameters for the PC5 interface for transmission of relay service is configured by the network-side device for the remote UE based on the QoS parameters of the to-be-initiated service, so that the PC5 interface can be reasonably configured to ensure end-to-end transmission performance of the service of the remote UE and improve system performance and user experiences.

In some embodiments, in the SIB and pre-configured message, the configuration parameters for the PC5 interface for transmission of relay service include a sidelink SL radio bearer RB configuration list and an SL radio link layer control protocol RLC bearer configuration list, the SLRB configuration list includes at least one SLRB configuration and an index of the at least one SLRB configuration; and the SL RLC bearer configuration list includes at least one RLC bearer configuration, an index of the at least one RLC bearer configuration, and an index of an SLRB configuration corresponding to the index of the RLC bearer configuration.

The network-side device may transmit the SLRB configuration list and the SL RLC bearer configuration list to the remote UE through a system information block or a pre-configured message, and the remote UE may look up, based on QoS parameters of a to-be-initiated service, corresponding SLRB configuration and RLC bearer configuration from the SLRB configuration list and the SL RLC bearer configuration list.

In some embodiments, the SLRB configuration list includes a first SLRB configuration list for UE-to-UE direct PC5 communication and a second SLRB configuration list for communication between the remote UE and the network-side device through the relay UE.

The SL RLC bearer configuration list includes a first RLC bearer configuration list for UE-to-UE direct PC5 communication and a second RLC bearer configuration list for communication between the remote UE and the network-side device through the relay UE.

To be specific, for the UE-to-UE direct PC5 communication and the communication between the remote UE and the network-side device through the relay UE, the network-side device configures corresponding two lists respectively, so that when communicating with the network-side device through the relay UE, the remote UE may look up, based on the QoS parameters of the to-be-initiated service, a corresponding SLRB configuration and RLC bearer configuration from the dedicated lists. For some configuration parameters, values in the first SLRB configuration list may be the same as values in the second SLRB configuration list. For some configuration parameters, values in the first SLRB configuration list may be different from values in the second SLRB configuration list. For some configuration parameters, values in the first RLC bearer configuration list may be the same as values in the second RLC bearer configuration list. For some configuration parameters, values in the first RLC bearer configuration list may be different from values in the second RLC bearer configuration list.

In some embodiments, the SLRB configuration includes a plurality of SLRB configuration parameters. At least one of the plurality of SLRB configuration parameters includes a first SLRB configuration value for UE-to-UE direct PC5 communication and a second SLRB configuration value for communication between the remote UE and the network-side device through the relay UE.

The RLC bearer configuration includes a plurality of RLC configuration parameters, and at least one of the plurality of RLC configuration parameters includes a first RLC bearer configuration value for UE-to-UE direct PC5 communication and a second RLC bearer configuration value for communication between the remote UE and the network-side device through the relay UE.

That is, for the UE-to-UE direct PC5 communication and the communication between the remote UE and the network-side device through the relay UE, the network-side device may be configured with different values of the SLRB configuration parameters and RLC bearer configuration parameters. For some configuration parameters, values corresponding to the UE-to-UE direct PC5 communication may be the same as values corresponding to the communication between the remote UE and the network-side device through the relay UE, that is, the two methods use same values. For some configuration parameters, values corresponding to the UE-to-UE direct PC5 communication may be different from values corresponding to the communication between the remote UE and the network-side device through the relay UE, that is, the two methods use different values.

In some embodiments, the SLRB configuration list includes SLRB configurations for UE-to-UE direct PC5 communication, and the method further includes any one of the following:

transmitting a first updating parameter for updating QoS parameters of a to-be-initiated service to the remote UE; and transmitting a second updating parameter for updating parameters in a found SLRB configuration and a found RLC bearer configuration to the remote UE.

In this way, the network-side device does not need to configure a dedicated SLRB configuration list and RLC bearer configuration list for communication between the remote UE and the network-side device through the relay UE, but only needs to configure the first updating parameter and the second updating parameter for the remote UE, which can reduce signaling overhead of the network-side device.

In some embodiments, the SLRB configuration includes at least one of the following:

an SL service data adaptation protocol SDAP configuration parameter;

an SL packet data convergence protocol PDCP configuration parameter; and a transmission range configuration parameter.

The RLC bearer configuration includes at least one of the following:

an RLC configuration parameter;

a medium access control MAC configuration parameter; and a physical layer configuration parameter.

The technical solutions of this application are further described below with reference to specific embodiments.

Embodiment 1

In this embodiment, configuration parameters for a PC5 interface for transmission of relay service are transmitted to remote UE through a SIB or a pre-configured message.

If the remote UE can read the SIB message or has obtained the pre-configured message, the remote UE can obtain the configuration information for the PC5 link dedicated to a relay architecture from the message.

Generally, the configuration information included in the SIB message or pre-configured message has the following structure:

a sidelink RB radio bearer configuration list: including an SL RB configuration index, an SL SDAP related configuration (including detailed list information of QoS flow(s) that can be mapped to this SLRB), an SL PDCP related configuration, a transmission range configuration, and the like.

The detailed list information of QoS flow(s) includes SL-PQI (PC5 QoS Indicator) and/or detailed QoS profile information (6 parameters including resource type (Resource Type), priority, packet delay budget, packet error rate, averaging window, and maximum data burst volume), SL guaranteed flow bit rate (GFBR), SL maximum flow bit rate (MFBR), SL transmission range information, and the like. If the SL-PQI is a standardized value, corresponding parameter information (6 parameter values) can be found through a standardized QoS profile table; and if the SL-PQI is a non-standardized PQI value, specific information of the QoS profile (specifically, 6 parameter values) needs to be carried; and a sidelink RLC bearer configuration list: including an RLC bearer configuration index, an SLRB configuration index, an RLC layer configuration, a MAC layer configuration, and the like, and possibly including physical layer related configurations.

As can be seen from the above, when one UE needs a sidelink configuration, the UE first finds, based on its own QoS parameter information, an SL RB configuration corresponding to matching QoS parameter information, and then finds, based on an SLRB configuration index, an associated RLC bearer configuration. In this way, necessary configuration information to be transmitted on the specific sidelink is determined. The so-called matching means that all QoS parameter information is exactly the same, or most of the information is the same. For example, the 6 parameters are completely consistent, the SL GFBRs are equal, the SL MFBRs are equal, and the SL transmission range parameters are consistent. In this way, if the matching QoS parameter information is found, the SLRB configuration and the RLC bearer configuration corresponding to information about this set of QoS parameters are transmission configuration parameters available to the UE. If the UE finds no matching QoS information, a default SLRB configuration is used.

The above procedure is applicable to a scenario of UE-to-UE direct PC5 link communication. When remote UE needs to access a network through relay UE, all the above QoS parameters are end-to-end transmission requirements, that is, transmission from the remote UE to a base station meets QoS requirements. In this case, if the QoS parameters are directly used to look up configuration parameters of the relevant PC5 link, selected configuration parameters cannot meet the end-to-end QoS requirements. For example, a PDB is for a transmission from the remote UE to the base station, directly using the PDB for determining parameters for a PC5 link is equivalent to giving no delay margin left for transmission between the relay UE and the base station, which may cause data to arrive at the base station beyond the PDB. In this case, to meet the end-to-end QoS requirements, the following modes can be used to allow the remote UE to obtain reasonable configuration parameters.

Mode 1: In the SIB message and the pre-configured message, another set of completely independent configuration lists is explicitly carried, dedicated to configuration of a sidelink interface in the case of sidelink relay, that is, the following contents are carried in the SIB message and the pre-configured message:

a sidelink RB radio bearer configuration list+a sidelink RLC bearer configuration list, this set of configurations includes configurations for UE-to-UE direct PC5 communication and QoS parameter mapping configurations; and when initiating a common PC5 service, the UE looks up this set of configurations, finds the corresponding configuration information, and performs PC5 communication; and a sidelink relay RB radio bearer configuration list+a sidelink relay RLC bearer configuration list, this set of configurations is independent of the above configurations and includes configurations for communication between the remote UE and the base station through the relay UE and QoS parameter mapping configurations; and when initiating a service that needs to be relayed, the remote UE looks up this set of configurations, finds the corresponding configuration information, and performs PC5 communication.

Mode 2: In the SIB message and the pre-configured message, an existing configuration structure, that is, a sidelink RB radio bearer configuration list+a sidelink RLC bearer configuration list, is still retained. For configuration of parameters that need to be distinguished, two different values are given for the direct PC5 link architecture and the relay architecture, and the remote UE selects corresponding parameters according to a service type initiated by itself. For example, in a same data structure, existing PDCP configuration parameters are retained, and a set of PDCP configuration parameters for the relay architecture are added. When the remote UE initiates a direct PC5 link service, values are taken from the existing PDCP parameters. If the remote UE initiates a relay-architecture transmission service, values are taken from the added PDCP configuration parameters.

Mode 3: In the SIB message and the pre-configured message, the existing configuration structure and parameters, that is, a sidelink RB radio bearer configuration list+a sidelink RLC bearer configuration list, are still retained. The remote UE performs different operations on the QoS parameter list in different cases, and uses the QoS parameter list after the operations to look up the corresponding SLRB configuration and RLC bearer configuration.

The performing different operations on the QoS parameter list means that:

when the remote UE initiates a direct PC5 link service, retaining the original QoS parameter list, and directly looking up the corresponding SLRB configuration and RLC bearer configuration; and when the remote UE performs service transmission through the relay architecture, updating the QoS parameters one by one according to a protocol specification or a parameter configured by a network side, and looking up the corresponding SLRB configuration and RLC bearer configuration by using the updated QoS parameter lists.

For example, for the PDB, a protocol may specify that the PDB is equally divided in two links in the relay architecture, that is, the PC5 link shares a delay margin of half of the PDB, and the Uu link shares a delay margin of the other half of the PDB. Alternatively, the network may configure parameters for allocation of the PDB. For example, parameters for allocation are also carried in the SIB and the pre-configured message, and a PDB allocation parameter which is set to 0.6 means that the PC5 link gets a delay margin of the PDB*0.6 and that the Uu link gets a delay margin of the remaining PDB*0.4. For another example, for the packet error rate PER, a protocol may specify an allocation method. For example, for an end-to-end packet error rate of $10^{-5}$, the PER needs to meet $10^{-6}$ on the PC5 link. Alternatively, a PER allocation parameter is set, for example, to 2, indicating that for an end-to-end packet error rate of $10^{-4}$, the PER needs to meet $10^{-4}/2=5*10^{-5}$ on the PC5 link. There are also some parameters for which allocation does not need to be performed, such as resource type, GFBR, MFBR, and SL range. For these parameters, the original parameters can be reused directly.

The remote UE uses the QoS parameters after allocation to look up an SL configuration, and an obtained configuration can satisfy a transmission with higher than original QoS requirements, ensuring that end-to-end QoS is met.

Mode 4: In the SIB message and the pre-configured message, the existing configuration structure and parameters, that is, a sidelink RB radio bearer configuration list+a sidelink RLC bearer configuration list, are still retained. The remote UE uses a QoS parameter list to look up a corresponding SLRB configuration and RLC bearer configuration in different cases, but performs different processing on the SLRB configuration and RLC bearer configuration in different cases to obtain final parameters.

The performing different processing on the SLRB configuration and RLC bearer configuration means that:

when the remote UE initiates a direct PC5 link service, using the original QoS parameter list to look up the corresponding SLRB configuration and RLC bearer configuration, and applying these parameters; and when the remote UE performs service transmission through the relay architecture, using the original QoS parameter list to look up the corresponding SLRB configuration and RLC bearer configuration, updating some configuration parameters according to a protocol specification or a parameter configured by a network side, and using the updated QoS parameters.

For example, if a value of an obtained PDCP discard timer is 100 ms, a protocol may specify that the value is equally divided in two links in the relay architecture, that is, the PC5 link shares a delay of half of the value, and the Uu link shares the other half, so that 50 ms can be calculated by dividing the configured value 100 ms of the PDCP discard timer by 2. Alternatively, the network may configure parameters for allocation of the delay. For example, parameters for allocation are also carried in the SIB and the pre-configured message, and a delay allocation parameter which is set to 0.6 means that a value for the PC5 link PDCP discard timer should be 100 ms*0.6=60 ms and that a value for the Uu link PDCP discard timer is the remaining 40 ms.

With the above modes, the remote UE can obtain the transmission configurations for the PC5 link dedicated to the relay architecture. Generally, this set of transmission configurations has a higher guarantee of QoS than that for a same service transmission over a direct PC5 link. In this way, it is ensured that after transmission over two links, end-to-end QoS requirements for a service are still met. Moreover, the network may have control over allocation of the QoS parameters across the two links, better meeting a requirement for maximum system efficiency.

Embodiment 2

In this embodiment, remote UE obtains configuration parameters for a PC5 interface for transmission of relay service from a network-side device or relay UE through a Uu interface RRC message.

In this embodiment, relevant configuration is performed on a PC5 link for the remote UE through the Uu interface RRC signaling for the remote UE to meet transmission requirements.

In an L2 relay architecture, PDCP and RRC protocol entities of the remote UE are in a base station. To meet communication requirements, the remote UE needs to establish an RRC connection with the base station, which is managed and controlled by the base station. Therefore, the RRC connection like a Uu interface is maintained between the remote UE and the base station, and the remote UE is equivalent to a sidelink TX UE in a connected state.

In this case, if the remote UE wants to perform service transmission, the remote UE needs to report QoS details of its to-be-initiated service to a serving cell, and the serving cell provides a corresponding SLRB configuration and RLC bearer configuration for the remote UE. In a case that the remote UE wants to transmit a service that is to be forwarded through relay UE, the remote UE needs to carry relay indication information in a service report, indicating that this is a relay service, thereby allowing a network side to configure appropriate parameters for the remote UE.

Remote UE under an L3 architecture does not need to be in a connected state from a perspective of PC5 link transmission, but it is possible that quality of the link from the UE to a network side is quite good, and RRC signaling transmission may be performed to some extent. Therefore, the remote UE may establish an RRC connection with the network side through an existing Uu procedure, and report QoS details of its to-be-initiated service to a serving cell when the service transmission is about to be performed, and the serving cell provides a corresponding SLRB configuration and RLC bearer configuration for the remote UE. In a case that the remote UE wants to transmit a service that is to be forwarded through relay UE, the remote UE needs to carry relay indication information in a service report, indicating that this is a relay service, thereby allowing a network side to configure appropriate parameters for the remote UE.

Generally, a QoS guarantee corresponding to configuration information obtained by the UE for a reported normal PC5 link service is slightly lower than a QoS guarantee provided by configuration information obtained for a reported relay service. This is mainly because in a relay architecture, for air interface transmissions over two links, allocation on QoS parameters need to be performed for the two links to meet final most end-to-end QoS requirements.

In this case, the remote UE directly interacts with the serving cell and reports explicit information, so that the serving cell can better perform QoS parameter allocation and precise configuration.

After obtaining the configuration, the remote UE uses the configuration to establish an SLRB and performs corresponding service transmission. In this case, the network side can perform configurations such as QoS parameter allocation and matching of the two links in a more flexible manner.

Embodiment 3

In this embodiment, remote UE obtains configuration parameters for a PC5 interface for transmission of relay service from relay UE through a PC5 interface RRC message.

In performing initial relay discovery or relay link establishment, service information needs to be exchanged between the remote UE and the relay UE, and the relay UE is also very clear about information of a to-be-initiated service of the remote UE. The relay UE may report QoS information of the service to a network side, and indicate that this is a relay service. The network side may determine its sidelink transmission configuration according to the QoS information, and transmit the configuration information to the relay UE through a Uu interface. The configuration information includes:

a configuration on the relay UE side when the service is transmitted on the sidelink; and a configuration on the remote UE side when the service is transmitted on the sidelink.

After receiving configuration information of the network side, if there is a separate configuration of the remote UE, the relay UE transmits the configuration to the remote UE by using PC5 RRC signaling; or if there is only a configuration of the relay UE, the relay UE uses its own configuration to generate a corresponding configuration of the remote UE, and transmits generated configuration information to the remote UE by using PC5 RRC signaling.

The remote UE obtains the configuration from the PC5 RRC signaling, which is generally an RRC reconfiguration message, carrying an SLRB configuration and RLC bearer configuration for the sidelink. The configuration is applied for SLRB establishment and data transmission.

In this case, the relay UE directly interacts with the serving cell and reports explicit service and relay information, so that the serving cell can better perform QoS parameter allocation and precise configuration. The network side can perform configurations such as QoS parameter allocation and matching of the two links in a more flexible manner.

Embodiment 4

In the foregoing embodiments, remote UE can obtain a dedicated configuration for a sidelink in relay transmission in many ways. Specifically, the remote UE can obtain the dedicated configuration for the sidelink in the relay transmission in different ways in different cases.

First, states of the remote UE may be distinguished. When the remote UE is in an idle or inactive state, the remote UE in such state can receive a SIB message transmitted by the network side, and the SIB message includes V2X control information. In this case, the remote UE may obtain the dedicated configuration for the sidelink in the relay transmission from the SIB message.

When the remote UE is in an offline state, the remote UE in such state cannot obtain any SIB message related to V2X, or cannot detect any cell meeting a camping condition in any V2X frequency. In this case, the remote UE may obtain the dedicated configuration for the sidelink in the relay transmission from a pre-configured message.

When the remote UE is in a connected state, which means that the remote UE can exchange Uu RRC signaling with a serving cell, the remote UE can obtain the dedicated configuration for the sidelink in the relay transmission by exchanging RRC signaling with the serving cell and reporting relay service information.

In addition, when in an idle state, inactive state, offline state, or connected state, the remote UE can obtain configuration parameters for a PC5 interface for transmission of relay service from relay UE through a PC5 RRC message.

It should be noted that the transmission method for remote UE provided in the embodiments of this application may be performed by a transmission apparatus of the remote UE, or by a control module in the transmission apparatus of the remote UE for performing the transmission method for the remote UE. In this embodiment of this application, the transmission method for remote UE provided in the embodiments of this application is described by using an example in which the transmission apparatus of the remote UE performs and loads the transmission method for the remote UE.

A transmission apparatus 400 of remote UE in this embodiment of this application is applied to the remote UE and as shown in FIG. 6, includes:

an obtaining module 410, configured to obtain configuration parameters for a PC5 interface for transmission of relay service from a network-side device or relay UE; and a transmission module 420, configured to establish, based on the obtained configuration parameters, a sidelink radio bearer SLRB and perform data transmission.

In some embodiments, the obtaining module 420 is specifically configured to perform any one of the following operations:

obtaining the configuration parameters for the PC5 interface for transmission of relay service through a system information block SIB of the network-side device if the remote UE is in an idle state or inactive state;

obtaining the configuration parameters for the PC5 interface for transmission of relay service through a pre-configured message of the network-side device if the remote UE is in an offline state;

obtaining the configuration parameters for the PC5 interface for transmission of relay service from the network-side device through a Uu radio resource control RRC message if the remote UE is in a connected state; and obtaining the configuration parameters for the PC5 interface for transmission of relay service from the relay UE through a PC5 RRC message if the remote UE is in an idle state, inactive state, offline state, or connected state.

In some embodiments, in the SIB and pre-configured message, the configuration parameters for the PC5 interface for transmission of relay service include a sidelink SL radio bearer RB configuration list and an SL radio link layer control protocol RLC bearer configuration list, the SLRB configuration list includes at least one SLRB configuration and an index of the at least one SLRB configuration; and the SL RLC bearer configuration list includes at least one RLC bearer configuration, an index of the at least one RLC bearer configuration, and an index of an SLRB configuration corresponding to the index of the RLC bearer configuration.

In some embodiments, the SLRB configuration list includes a first SLRB configuration list for UE-to-UE direct PC5 communication and a second SLRB configuration list for communication between the remote UE and the network-side device through the relay UE.

The SL RLC bearer configuration list includes a first RLC bearer configuration list for UE-to-UE direct PC5 communication and a second RLC bearer configuration list for communication between the remote UE and the network-side device through the relay UE.

In some embodiments, the SLRB configuration includes a plurality of SLRB configuration parameters. At least one of the plurality of SLRB configuration parameters includes a first SLRB configuration value for UE-to-UE direct PC5 communication and a second SLRB configuration value for communication between the remote UE and the network-side device through the relay UE.

The RLC bearer configuration includes a plurality of RLC configuration parameters, and at least one of the plurality of RLC configuration parameters includes a first RLC bearer configuration value for UE-to-UE direct PC5 communication and a second RLC bearer configuration value for communication between the remote UE and the network-side device through the relay UE.

In some embodiments, the transmission module is specifically configured to: update quality of service QoS parameters of a to-be-initiated service according to a protocol specification or a first updating parameter configured by the network-side device; and look up an SLRB configuration and an RLC bearer configuration by using the updated QoS parameters.

In some embodiments, the transmission module is specifically configured to: look up, based on QoS parameters of a to-be-initiated service, an SLRB configuration and an RLC bearer configuration that match the QoS parameters; update parameters in a found SLRB configuration and a found RLC bearer configuration according to a protocol specification or a second updating parameter configured by the network-side device; and establish an SLRB based on the updated parameters and perform data transmission.

The transmission apparatus of the remote UE in this embodiment of this application may be an apparatus, or may be a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The transmission apparatus of the remote UE in this embodiment of this application may be an apparatus with an operating system. The operating system may be an Android operating system, may be an iOS operating system, or may be another possible operating system. This is not specifically limited in the embodiments of this application.

The transmission apparatus of the remote UE in this embodiment of this application can implement the processes implemented by the transmission apparatus of the remote UE in the method embodiment in FIG. 3. To avoid repetition, details are not described herein again.

It should be noted that the configuration method for remote UE provided in the embodiments of this application may be performed by a configuration apparatus for remote UE, or by a control module in the configuration apparatus for remote UE for performing the configuration method for the remote UE. In this embodiment of this application, the configuration method for remote UE provided in the embodiments of this application is described by using an example in which the configuration apparatus for remote UE performs and loads the configuration method for the remote UE.

Figure 7:
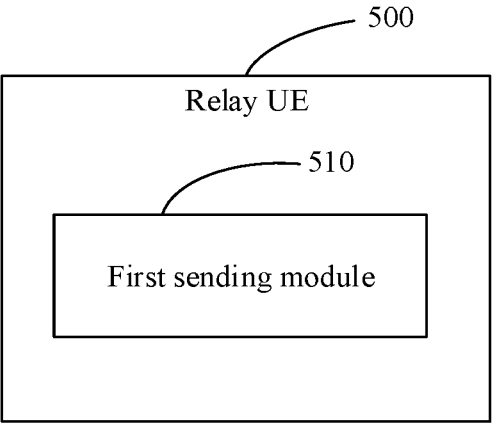
FIG. 7 is a schematic modular structure diagram of relay UE according to an embodiment of this application.

A configuration apparatus 500 for remote UE in this embodiment of this application is applied to relay UE and as shown in FIG. 7, includes:

a first sending module 510, configured to transmit configuration parameters for a PC5 interface for transmission of relay service to the remote UE through a PC5 radio resource control RRC message.

In some embodiments, the configuration apparatus 500 for the remote UE further includes:

a receiving module, configured to receive quality of service QoS parameters of a to-be-initiated service transmitted by the remote UE; where the first sending module is further configured to report the QoS parameters of the to-be-initiated service of the remote UE to a network-side device; and the receiving module is further configured to: receive configuration information transmitted by the network-side device through a Uu interface, where the configuration information includes configuration information for relay UE and/or configuration information for the remote UE; and generate, based on the configuration information transmitted by the network-side device, configuration parameters for the PC5 interface for transmission of relay service.

The configuration apparatus for remote UE in this embodiment of this application may be an apparatus, or may be a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The configuration apparatus for remote UE in this embodiment of this application may be an apparatus with an operating system. The operating system may be an Android operating system, may be an iOS operating system, or may be another possible operating system. This is not specifically limited in the embodiments of this application.

The configuration apparatus for remote UE in this embodiment of this application can implement the processes implemented by the configuration apparatus for remote UE in the method embodiment in FIG. 4. To avoid repetition, details are not described herein again.

It should be noted that the configuration method for remote UE provided in the embodiments of this application may be performed by a configuration apparatus for remote UE, or by a control module in the configuration apparatus for remote UE for performing the configuration method for the remote UE. In this embodiment of this application, the configuration method for remote UE provided in the embodiments of this application is described by using an example in which the configuration apparatus for remote UE performs and loads the configuration method for the remote UE.

Figure 8:
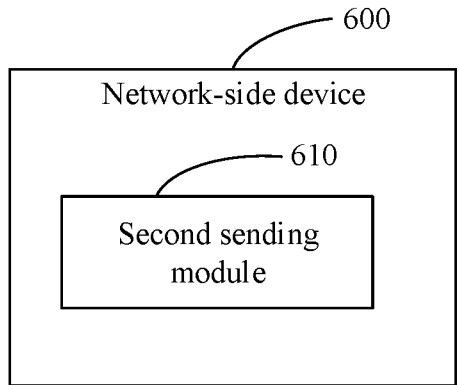
FIG. 8 is a schematic modular structural diagram of a network-side device according to an embodiment of this application.

A configuration apparatus 600 for remote UE in this embodiment of this application is applied to a network-side device and as shown in FIG. 8, includes:

a second sending module 610, configured to transmit configuration parameters for a PC5 interface for transmission of relay service to the remote UE through any one of the following manners:

transmitting the configuration parameters for the PC5 interface for transmission of relay service to the remote UE through a system information block SIB of a network-side device;

transmitting the configuration parameters for the PC5 interface for transmission of relay service to the remote UE through a pre-configured message;

transmitting the configuration parameters for the PC5 interface for transmission of relay service to the remote UE through a Uu radio resource control RRC message; and forwarding the configuration parameters for the PC5 interface for transmission of relay service to the remote UE through relay UE.

In some embodiments, the configuration apparatus 600 for the remote UE further includes:

a first receiving module, configured to receive quality of service QoS parameters of a to-be-initiated service reported by the remote UE; and a first processing module, configured to determine, based on the QoS parameters, configuration parameters for the PC5 interface for transmission of relay service.

In some embodiments, the configuration apparatus 600 for the remote UE further includes:

a second receiving module, configured to receive the quality of service QoS parameters of the to-be-initiated service of the remote UE reported by the relay UE; and a second processing module, configured to determine, based on the QoS parameters, configuration parameters for the PC5 interface for transmission of relay service.

In some embodiments, the second sending module is further configured to perform any one of the following operations:

transmitting a first updating parameter for updating QoS parameters of a to-be-initiated service to the remote UE; and transmitting a second updating parameter for updating parameters in a found SLRB configuration and a found RLC bearer configuration to the remote UE.

The configuration apparatus for remote UE in this embodiment of this application may be an apparatus, or may be a non-mobile electronic device. For example, the non-mobile electronic device may be a base station, a network attached storage (NAS), a personal computer (PC), a television (TV), a teller machine, a self-service machine, or the like. This is not specifically limited in the embodiments of this application.

The configuration apparatus for remote UE in this embodiment of this application may be an apparatus with an operating system. The operating system may be an Android operating system, may be an iOS operating system, or may be another possible operating system. This is not specifically limited in the embodiments of this application.

The configuration apparatus for remote UE in this embodiment of this application can implement the processes implemented by the configuration apparatus for remote UE in the method embodiment in FIG. 5. To avoid repetition, details are not described herein again.

Optionally, an embodiment of this application further provides an electronic device, including a processor, a memory, and a program or instruction stored in the memory and capable of running on the processor. When the program or instruction is executed by the processor, the processes of the foregoing embodiments of the configuration method for remote UE and the transmission method of remote UE are implemented, with same technical effects achieved. To avoid repetition, details are not described herein again.

It should be noted that the electronic device in this embodiment of this application includes the foregoing mobile electronic device and non-mobile electronic device.

Figure 9:
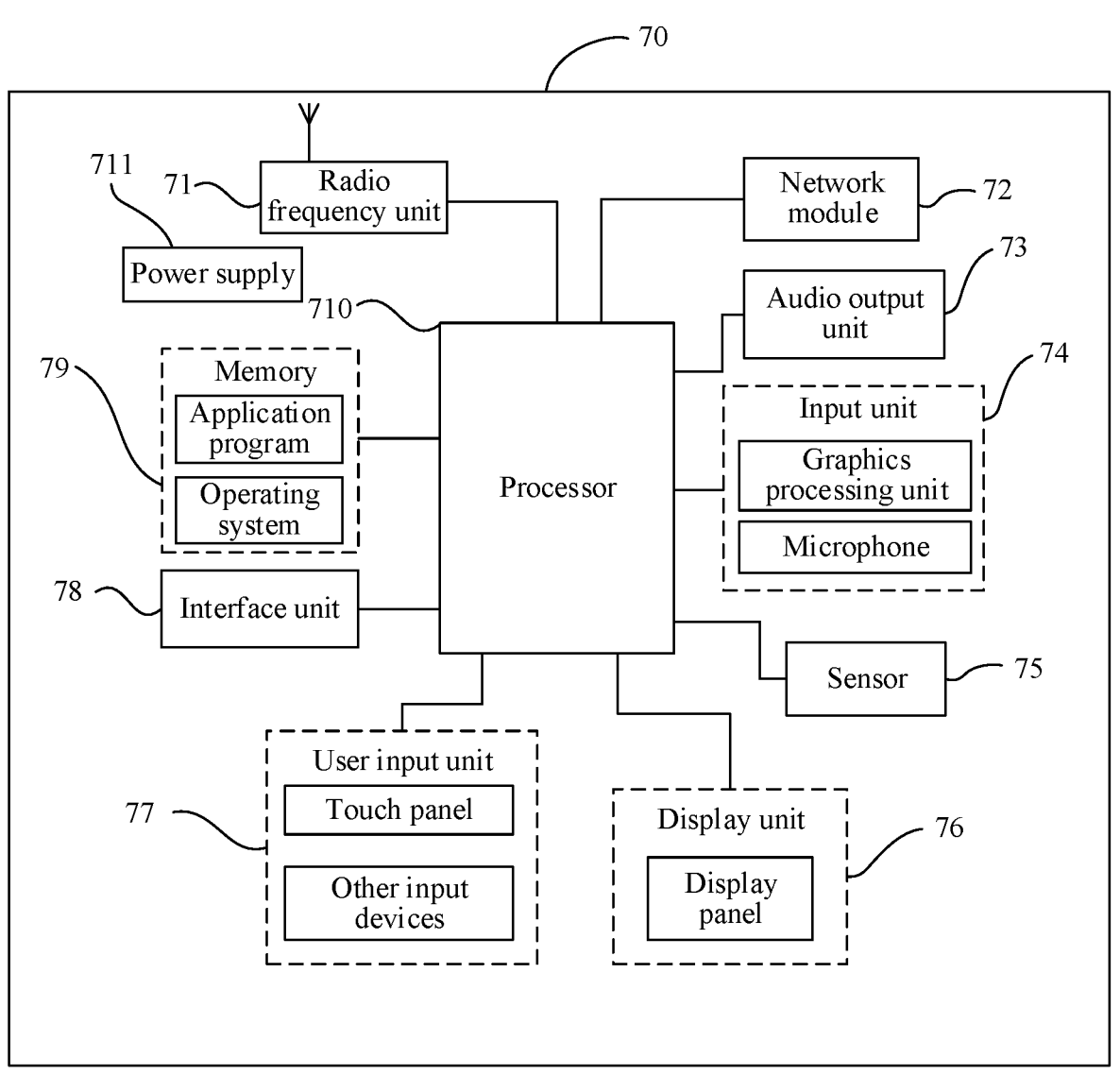
FIG. 9 is a block diagram of a terminal according to an embodiment of this application.

The electronic device in this embodiment may be a terminal. FIG. 9 is a schematic diagram of a hardware structure of a terminal for implementing the embodiments of the present invention. The terminal 70 includes but is not limited to components such as a radio frequency unit 71, a network module 72, an audio output unit 73, an input unit 74, a sensor 75, a display unit 76, a user input unit 77, an interface unit 78, a memory 79, a processor 710, and a power supply 711. Those skilled in the art may understand that the terminal structure shown in FIG. 9 does not constitute a limitation to the terminal. The terminal may include more or fewer components than those shown in the figure, or some components may be combined, or there may be a different component arrangement. In this embodiment of this application, the terminal includes but is not limited to a mobile phone, a tablet computer, a laptop computer, a palmtop computer, a vehicle-mounted mobile terminal, a wearable device, and a pedometer.

It should be understood that in this embodiment of this application, the radio frequency unit 71 may be configured to: receive and transmit information, or to receive and transmit a signal in a call process, and specifically, after receiving downlink data from a base station, transmit the downlink data to the processor 710 for processing; and transmit uplink data to the base station. Generally, the radio frequency unit 71 includes but is not limited to an antenna, at least one amplifier, a transceiver, a coupler, a low noise amplifier, and a duplexer. In addition, the radio frequency unit 71 may further communicate with a network and another device through a wireless communications system.

The memory 79 may be configured to store software programs and various data. The memory 79 may mainly include a program storage area and a data storage area. The program storage area may store an operating system, an application program required by at least one function (for example, an audio play function or an image play function), and the like. The data storage area may store data (for example, audio data and contacts) created based on usage of the mobile phone. In addition, the memory 79 may include a high-speed random access memory, and may further include a non-volatile memory such as at least one disk storage device, a flash memory device, or another volatile solid-state storage device.

The processor 710 is a control center of the terminal, and connects all parts of the entire terminal by using various interfaces and lines. By running or executing a software program and/or a module stored in the memory 79 and invoking data stored in the memory 79, the processor 710 performs various functions of the terminal and data processing, so as to perform overall monitoring on the terminal. The processor 710 may include one or more processing units. Preferably, the processor 710 may integrate an application processor and a modem processor. The application processor mainly processes an operating system, a user interface, an application program, and the like. The modem processor mainly processes wireless communication. It can be understood that the modem processor may alternatively not be integrated in the processor 710.

The terminal 70 may further include the power supply 711 (for example, a battery) that supplies power to various components. Preferably, the power supply 711 may be logically connected to the processor 710 through a power supply management system, so that functions such as charging and discharging management and power consumption management are implemented by using the power management system.

In addition, the terminal 70 includes some functional modules that are not shown. Details are not described herein.

Figure 10:
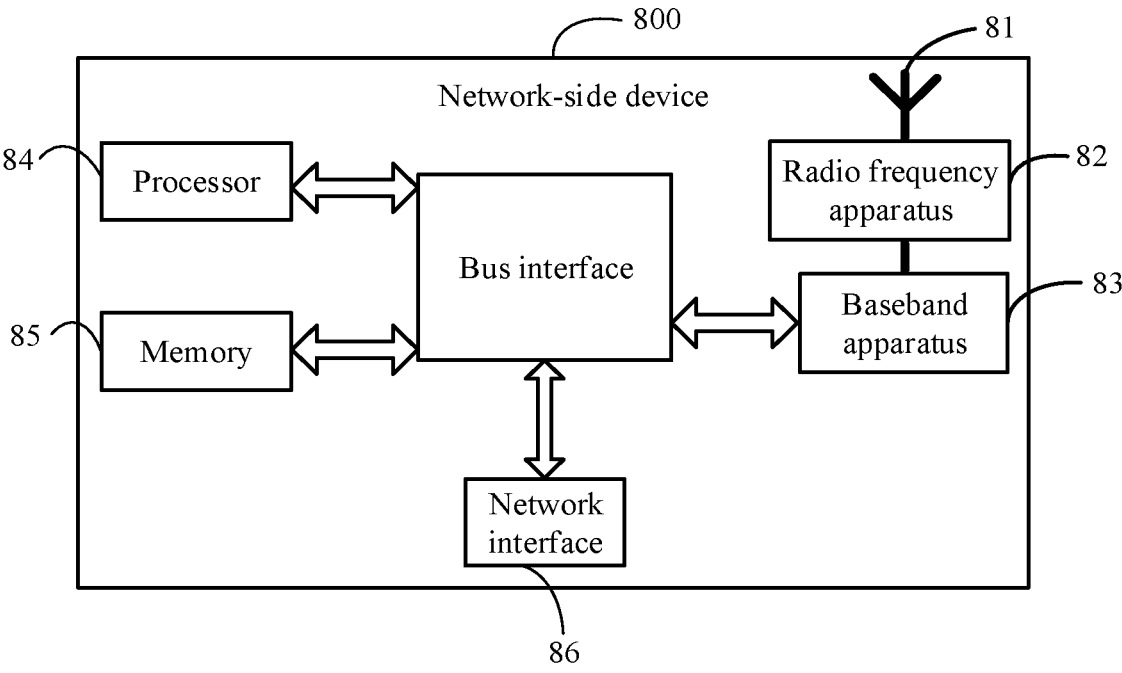
FIG. 10 is a block diagram of a network-side device according to an embodiment of this application.

The electronic device in this embodiment may be a network-side device. As shown in FIG. 10, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-transmitted information, and transmits the information to the radio frequency apparatus 82; and the radio frequency apparatus 82 processes the received information and then transmits the information by using the antenna 81.

The frequency band processing apparatus may be located in the baseband apparatus 83. The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 10, one of the chips, for example, the processor 84, is connected to the memory 85, to invoke the program in the memory 85 to perform the operations of the network-side device shown in the foregoing method embodiment.

The baseband apparatus 83 may further include a network interface 86, configured to exchange information with the radio frequency apparatus 82, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network-side device, for example, one or more microprocessors DSPs, or one or more field programmable gate arrays FPGAs. A storage component may be a memory, or may be a collective term for a plurality of storage components.

The memory 85 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 85 described in this application is intended to include but is not limited to these and any other suitable types of memories.

An embodiment of this application further provides a readable storage medium, where the readable storage medium stores a program or instruction, and when the program or instruction is executed by a processor, the processes of the foregoing embodiments of the configuration method for remote UE or the transmission method of remote UE are implemented, with the same technical effect achieved. To avoid repetition, details are not described herein again.

The processor is the processor of the electronic device in the foregoing embodiment. The readable storage medium includes a computer-readable storage medium such as a read-only memory (ROM), a random access memory (RAM), a magnetic disk, an optical disc, or the like.

An embodiment of the present invention further provides a chip, where the chip includes a processor and a communications interface, the communications interface is coupled to the processor, and the processor is configured to run a program or instruction to implement the processes of the foregoing embodiments of the configuration method for remote UE or the transmission method of remote UE, with the same technical effects achieved. To avoid repetition, details are not described herein again.

It should be understood that the chip mentioned in this embodiment of this application may also be referred to as a system-on-chip, a system chip, a chip system, or the like.

An embodiment of this application further provides a computer program product, stored in a readable storage medium, where the computer program product is executed by at least one processor to implement the processes of the foregoing embodiments of the configuration method for remote UE or the transmission method of remote UE, with the same technical effects achieved. To avoid repetition, details are not described herein again.

An embodiment of this application further provides a terminal, where the terminal is configured to implement the processes of the foregoing embodiments of the configuration method for remote UE or the transmission method of remote UE, with the same technical effects achieved. To avoid repetition, details are not described herein again.

It should be noted that the terms "comprise", "include", or any of their variants in this specification are intended to cover a non-exclusive inclusion, such that a process, a method, an article, or an apparatus that includes a list of elements includes not only those elements but also other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

The embodiments of this application are described above with reference to the accompanying drawings, but this application is not limited to the foregoing implementations. The foregoing implementations are only illustrative rather than restrictive. Inspired by this application, persons of ordinary skill in the art can still derive many variations without departing from the essence of this application and the protection scope of the claims. All these variations shall fall within the protection of this application.

What is claimed is:

1. A transmission method for a remote terminal UE, comprising:

obtaining configuration parameters for a PC5 interface for transmission of relay service from a network-side device; and establishing, based on the obtained configuration parameters, a sidelink radio bearer SLRB and performing data transmission, wherein the obtaining configuration parameters for a PC5 interface for transmission of relay service from a network-side device comprises:

obtaining the configuration parameters for the PC5 interface for transmission of relay service from the network-side device through a Uu radio resource control RRC message if the remote UE is in a connected state;

wherein before the obtaining the configuration parameters for the PC5 interface for transmission of relay service through a Uu RRC message, the method further comprises transmitting QoS parameters of a to-be-initiated service and relay indication information to the network-side device, wherein the QoS parameters of the to-be-initiated service are used to configure, for the remote UE, dedicated configuration parameters for the PC5 interface for transmission of a relay service, wherein the configuration parameters for the PC5 interface for transmission of relay service comprises at least one sidelink SL radio bearer (SLRB) configuration and at least one radio link layer control protocol (RLC) bearer configuration, wherein, the SLRB configuration comprises at least one of following:

an SL service data adaptation protocol (SDAP) configuration parameter; or an SL packet data convergence protocol (PDCP) configuration parameter;

wherein the RLC bearer configuration comprises at least one of the following:

an RLC configuration parameter; or a medium access control (MAC) configuration parameter;

wherein the obtaining configuration parameters for a PC5 interface for transmission of relay service from a network-side device or relay UE further comprises any one of the following:

obtaining the configuration parameters for the PC5 interface for transmission of relay service through a system information block SIB of the network-side device if the remote UE is in an idle state or inactive state;

obtaining the configuration parameters for the PC5 interface for transmission of relay service through a pre-configured message of the network-side device if the remote UE is in an offline state;

wherein in the SIB and pre-configured message, the configuration parameters for the PC5 interface for transmission of relay service comprise a sidelink SL radio bearer RB configuration list and an SL radio link layer control protocol RLC bearer configuration list;

wherein the SLRB configuration list comprises a first SLRB configuration list for UE-to-UE direct PC5 communication and a second SLRB configuration list for communication between the remote UE and the network-side device through the relay UE; and the SL RLC bearer configuration list comprises a first RLC bearer configuration list for UE-to-UE direct PC5 communication and a second RLC bearer configuration list for communication between the remote UE and the network-side device through the relay UE.

2. The transmission method for remote UE according to claim 1, wherein the SLRB configuration list further comprises an index of the at least one SLRB configuration; and the SL RLC bearer configuration list further comprises an index of the at least one RLC bearer configuration, and an index of an SLRB configuration corresponding to the index of the RLC bearer configuration.

3. The transmission method for remote UE according to claim 2, wherein the SLRB configuration further comprises a transmission range configuration parameter; and the RLC bearer configuration further comprises a physical layer configuration parameter.

4. The transmission method for remote UE according to claim 1, wherein the SLRB configuration comprises a plurality of SLRB configuration parameters, and at least one of the plurality of SLRB configuration parameters comprises a first SLRB configuration value for UE-to-UE direct PC5 communication and a second SLRB configuration value for communication between the remote UE and the network-side device through the relay UE; and the RLC bearer configuration comprises a plurality of RLC configuration parameters, and at least one of the plurality of RLC configuration parameters comprises a first RLC bearer configuration value for UE-to-UE direct PC5 communication and a second RLC bearer configuration value for communication between the remote UE and the network-side device through the relay UE.

5. The transmission method for remote UE according to claim 1, wherein the SLRB configuration list comprises SLRB configurations for UE-to-UE direct PC5 communication, and the establishing, based on the obtained configuration parameters, an SLRB and performing data transmission comprises:

updating quality of service QoS parameters of a to-be-initiated service according to a protocol specification or a first updating parameter configured by the network-side device; and looking up an SLRB configuration and an RLC bearer configuration by using the updated QoS parameters.

6. The transmission method for remote UE according to claim 5, wherein the looking up, based on QoS parameters, an SLRB configuration and an RLC bearer configuration comprises:

looking up, based on the QoS parameters, an SLRB configuration matching the QoS parameters in the SLRB configuration list, looking up, based on an index of the SLRB configuration, an index of a corresponding RLC bearer configuration, looking up, based on the index of the RLC bearer configuration, the corresponding RLC bearer configuration, and establishing, based on the found SLRB configuration and the found RLC bearer configuration, an SLRB and performing data transmission; and using a default SLRB as a configured SLRB to perform data transmission if no SLRB configuration matching the QoS parameters is found in the SLRB configuration list.

7. The transmission method for remote UE according to claim 1, wherein the SLRB configuration list comprises SLRB configurations for UE-to-UE direct PC5 communication, and the establishing, based on the obtained configuration parameters, an SLRB and performing data transmission comprises:

looking up, based on QoS parameters of a to-be-initiated service, an SLRB configuration and an RLC bearer configuration that match the QoS parameters;

updating parameters in a found SLRB configuration and a found RLC bearer configuration according to a protocol specification or a second updating parameter configured by the network-side device; and establishing an SLRB based on the updated parameters and performing data transmission.

8. An electronic device, comprising a processor, a memory, and a program or instruction stored in the memory and capable of running on the processor, wherein when the program or instruction is executed by the processor, the processor is configured to execute the steps of the method according to claim 1.

9. A configuration method for a remote terminal UE, comprising:

transmitting configuration parameters for a PC5 interface for transmission of relay service to the remote UE through the following manner:

transmitting the configuration parameters for the PC5 interface for transmission of relay service to the remote UE through a Uu radio resource control RRC message, wherein before the transmitting the configuration parameters for the PC5 interface for transmission of relay service to the remote UE through a Uu RRC message, the method further comprises: receiving quality of service QoS parameters of a to-be-initiated service reported by the remote UE, wherein the QoS parameters of the to-be-initiated service are used to configure, for the remote UE, dedicated configuration parameters for the PC5 interface for transmission of a relay service, wherein the configuration parameters for the PC5 interface for transmission of relay service comprises at least one sidelink SL radio bearer (SLRB) configuration and at least one RLC radio link layer control protocol (RLC) bearer configuration, wherein, the SLRB configuration comprises at least one of following:

an SL service data adaptation protocol (SDAP) configuration parameter; or an SL packet data convergence protocol (PDCP) configuration parameter;

wherein the RLC bearer configuration comprises at least one of the following:

an RLC configuration parameter; or a medium access control (MAC) configuration parameter;

transmitting configuration parameters for a PC5 interface for transmission of relay service to the remote UE further through any one of the following manners:

transmitting the configuration parameters for the PC5 interface for transmission of relay service to the remote UE through a system information block SIB of a network-side device;

transmitting the configuration parameters for the PC5 interface for transmission of relay service to the remote UE through a pre-configured message;

wherein in the SIB and pre-configured message, the configuration parameters for the PC5 interface for transmission of relay service comprise a sidelink SL radio bearer RB configuration list and an SL radio link layer control protocol RLC bearer configuration list;

wherein the SLRB configuration list comprises a first SLRB configuration list for UE-to-UE direct PC5 communication and a second SLRB configuration list for communication between the remote UE and the network-side device through the relay UE; and the SL RLC bearer configuration list comprises a first RLC bearer configuration list for UE-to-UE direct PC5 communication and a second RLC bearer configuration list for communication between the remote UE and the network-side device through the relay UE.

10. The configuration method for remote UE according to claim 9, wherein after receiving the QoS parameters of the to-be-initiated service reported by the remote UE, the method further comprises:

determining, based on the QoS parameters, configuration parameters for the PC5 interface for transmission of relay service.

11. An electronic device, comprising a processor, a memory, and a program or instruction stored in the memory and capable of running on the processor, wherein when the program or instruction is executed by the processor, the processor is configured to execute the steps of the method according to claim 9.

* * * * *